United States Patent
Takenaka et al.

(10) Patent No.: US 7,211,912 B2
(45) Date of Patent: May 1, 2007

(54) DRIVE SYSTEM INCLUDING ELECTRIC POWER DEVICES

(75) Inventors: Masayuki Takenaka, Anjo (JP); Kozo Yamaguchi, Anjo (JP); Takahiro Kido, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 258 days.

(21) Appl. No.: 10/800,867

(22) Filed: Mar. 16, 2004

(65) Prior Publication Data
US 2004/0226761 A1  Nov. 18, 2004

(30) Foreign Application Priority Data
May 13, 2003  (JP) .............................. 2003-135106

(51) Int. Cl.
*H02K 9/00* (2006.01)

(52) U.S. Cl. .......................................... 310/54; 310/52

(58) Field of Classification Search .................. 310/52, 310/54, 58, 64
See application file for complete search history.

(56) References Cited
U.S. PATENT DOCUMENTS 5,513,719 A   5/1996  Moroto et al.
5,821,653 A * 10/1998  Kinto et al. .................. 310/89
6,218,747 B1 *  4/2001  Tsuruhara ..................... 310/54
6,323,613 B1 * 11/2001  Hara et al. ................... 318/471
6,833,641 B2 * 12/2004  Uchida et al. ................ 310/54

FOREIGN PATENT DOCUMENTS

JP        A 6-328950       11/1994

* cited by examiner

Primary Examiner—Darren Schuberg
Assistant Examiner—Nguyen N. Hanh
(74) Attorney, Agent, or Firm—Oliff & Berridge, PLC (57) ABSTRACT

A drive system includes a plurality of electric power devices, a drive case having a plurality of case segments which are connected to each other, each of the electric power devices being contained in one of the case segments, and a plurality of inverters, one for each of the electric power devices. The inverters are collectively attached to one of the case segments, and a flow path of a coolant for cooling the inverters is positioned between the case segment to which the inverters are attached and the inverters. Accordingly, a cooling unit which performs heat insulation and cooling between the drive system and the inverters is positioned only on the outer surface of one of the case segments and does not extend across the connection interfaces between the case segments. Therefore, the risk of leakage of the coolant into the drive case can be substantially eliminated.

25 Claims, 6 Drawing Sheets

DRIVE SYSTEM INCLUDING ELECTRIC POWER DEVICES

This application claims priority from JP 2003-135106, filed May 13, 2003, the disclosure of which is incorporated herein by reference thereto.

BACKGROUND OF THE INVENTION

1. Field of Invention

The invention relates to a drive system including a plurality of electric power devices, and more specifically relates to a technique for integrating inverters with a drive system for an electric vehicle or a hybrid vehicle.

2. Description of Related Art

As an example of a known drive system for a hybrid vehicle, Japanese Unexamined Patent Application Publication No. 6-328950 discloses a drive system including two electric power devices (in the present specification, the term "electric power device" generically refers to motors, motor generators, and generators) and a drive case constructed of case segments, each electric power device being contained in one of the case segments. The case segments are combined together such that the two electric power devices are mounted on a common shaft in the drive case, and the size of the drive system is thereby reduced.

Drive systems for a hybrid vehicle or an electric vehicle generally include three-phase brushless electric power devices as the vehicle's drive source and for energy regeneration. When the electric power devices are operated with a direct-current power supply mounted in the vehicle, an inverter having a power module, which includes a switching element, is required for each of the electric power devices (the inverter functions as a converter during energy regeneration by a motor or power generation by a generator). Although the inverters may be arranged separately from their respective electric power devices at suitable positions as they are connected to the electric power devices with power cables, the inverters are preferably integrated with their respective electric power devices for convenience in mounting them in the vehicle.

Currently, however, the maximum operating temperature of the inverters is lower than that of the electric power devices. Therefore, when the inverters are integrated with the drive system as described above, direct heat conduction from the drive system to the inverters must be blocked in some way to protect the inverters. In addition, because the temperature of the inverters increases due to heat emitted from the switching elements included therein, the inverters must be cooled to keep the temperature below the maximum operating temperature. For this purpose, a cooling unit may be disposed between the drive system and the inverters and heat insulation and cooling may be achieved by causing a coolant to flow inside the cooling unit.

When the inverters are integrated with the above-described drive system for a hybrid vehicle or with a drive system for an electric vehicle which includes a plurality of electric power devices, the inverters may be arranged on their respective case segments of the drive case. In this case, however, the coolant's flow path interposed between the drive case and the inverters, for achieving heat insulation and cooling of the inverters, extends across the interfaces between the case segments, and there is a risk that the coolant which flows through the flow path will leak into the drive case along the connection interfaces between the case segments. Such leakage must be prevented as it may lead to a reduction in the insulation performance of the electric power devices.

SUMMARY OF THE INVENTION

An object of the invention is to provide a drive system in which a plurality of electric power devices are contained in their respective case segments and in which cooling of inverters for the electric power devices and integration of the inverters with the drive system are both achieved.

In order to attain the above-described object, a drive system according to the invention includes a plurality of electric power devices; a drive case having a plurality of case segments which are connected to each other, each of the electric power devices being contained in one of the case segments; and a plurality of inverters, one for each of the electric power devices. The inverters are collectively attached to one of the case segments, and a flow path of a coolant for cooling the inverters is positioned between the case segment to which the inverters are collectively attached and the inverters.

According to the above-described structure, a cooling unit through which the coolant flows for heat insulation and cooling between the drive system and the inverters is positioned only on the outer surface of one of case segments and does not extend across the connection interfaces between the case segments. Therefore, the risk of leakage of the coolant into the drive case can be substantially eliminated.

In the above-described structure, it is effective to dispose the inverters in a common inverter case which is attached to the drive case, and to position the flow path of the coolant between the case segment to which the inverters are attached and the inverter case. In such a case, the inverters can be blocked off from the flow path of the coolant by the inverter case without providing a sealing member, and therefore the coolant can be reliably prevented from coming into contact with the inverters. In addition, the inverters can be more efficiently assembled onto the drive case compared to the case in which the inverters are individually attached to the drive case.

The inverter case may be attached to the drive case such that the inverter case extends over the case segments, and two sealing members may be provided, one interposed between the case segment to which the inverters are collectively attached and the inverter case and the other between the drive case and the inverter case. In such a case, the gap between the inverter case which is adjacent to the flow path of the coolant and the case segment to which the inverters are collectively attached and the gap between the inverter case and the drive case can be reliably sealed. In addition, the structure of the sealing members can be simplified and the risk of leakage can be reduced.

In this case, preferably, the sealing member interposed between the drive case and the inverter case is composed of a cork gasket, foam rubber, a grommet, etc., which tolerate a step, or misalignment, between the case segments. Accordingly, the sealing surface can extend across the interfaces between the case segments, and the gap between the inverter case and the drive case can be reliably sealed even though the drive case has a step, or misalignment, between the case segments which is inevitable due to processing errors and/or assembly errors.

In is also effective to attach the inverter case to the drive case such that the inverter case extends over the case segments and to provide a plurality of sealing members, one interposed between each of the case segments and the inverter case. In such a case, no sealing surface extends across the interfaces between the case segments, so that the gap between the inverter case and the drive case can be more reliably sealed without being affected by the step, or misalignment, between the case segments which is formed due to processing errors and/or assembly errors.

Instead of the structure where the inverters are contained in a common inverter case which is attached to the drive case, the structure of the drive system may also be such that the inverters are fixed on a common base which is attached to one of the case segments and the flow path of the coolant is positioned between the case segment to which the inverters are collectively attached and the base. In such a case, the inverters can be blocked off from the flow path of the coolant by the base without providing a sealing member, and therefore the coolant can be reliably prevented from coming into contact with the inverters. In addition, the inverters can be more efficiently assembled onto the drive case compared to the case in which the inverters are individually attached to the drive case.

In either the structure in which the inverter case is provided or the structure in which the base is provided, it is effective to connect the electric power devices to their respective inverters with connection parts which extend out from the corresponding case segments. In such a case, the electric power devices can be individually subjected to completion tests, and therefore the yield can be increased. In addition, it is not necessary to form service holes for connection in the drive case, so that the costs can be reduced and the assembly process can be performed more easily.

In addition, it is more effective if each of the connection parts has a terminal which extends through the corresponding case segment and which projects into the inverter case. In such a case, the electric power devices can be individually connected to their respective inverters with a simple structure, and the connecting process can be performed in the inverter case without any wiring.

Furthermore, it is more effective if each of the terminals is positioned near an opening of the corresponding case segment. In such a case, each of the electric power devices can be connected to its respective terminal at a position near the opening of the corresponding case segment. Therefore, the assembly process of the drive system can be performed more efficiently.

BRIEF DESCRIPTION OF THE DRAWINGS

Embodiments of the invention will be described below with reference to the accompanying drawings, in which.

DETAILED DESCRIPTION OF PREFERRED EMBODIMENTS

Figure 1:
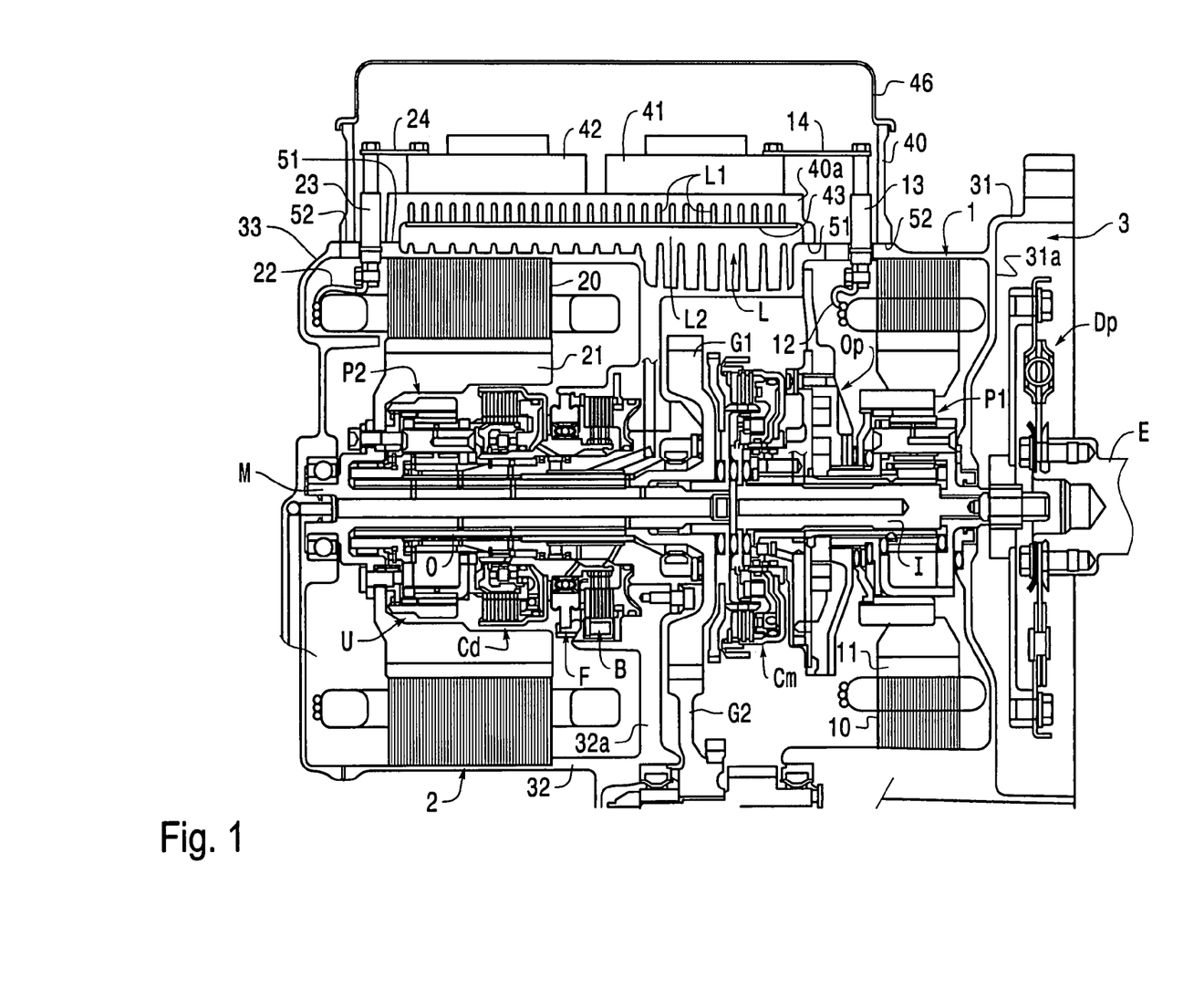
FIG. 1 is a diagram showing a part of a developed sectional view of a drive system including electric power devices according to a first embodiment of the invention taken along an axial direction.
Figure 2:
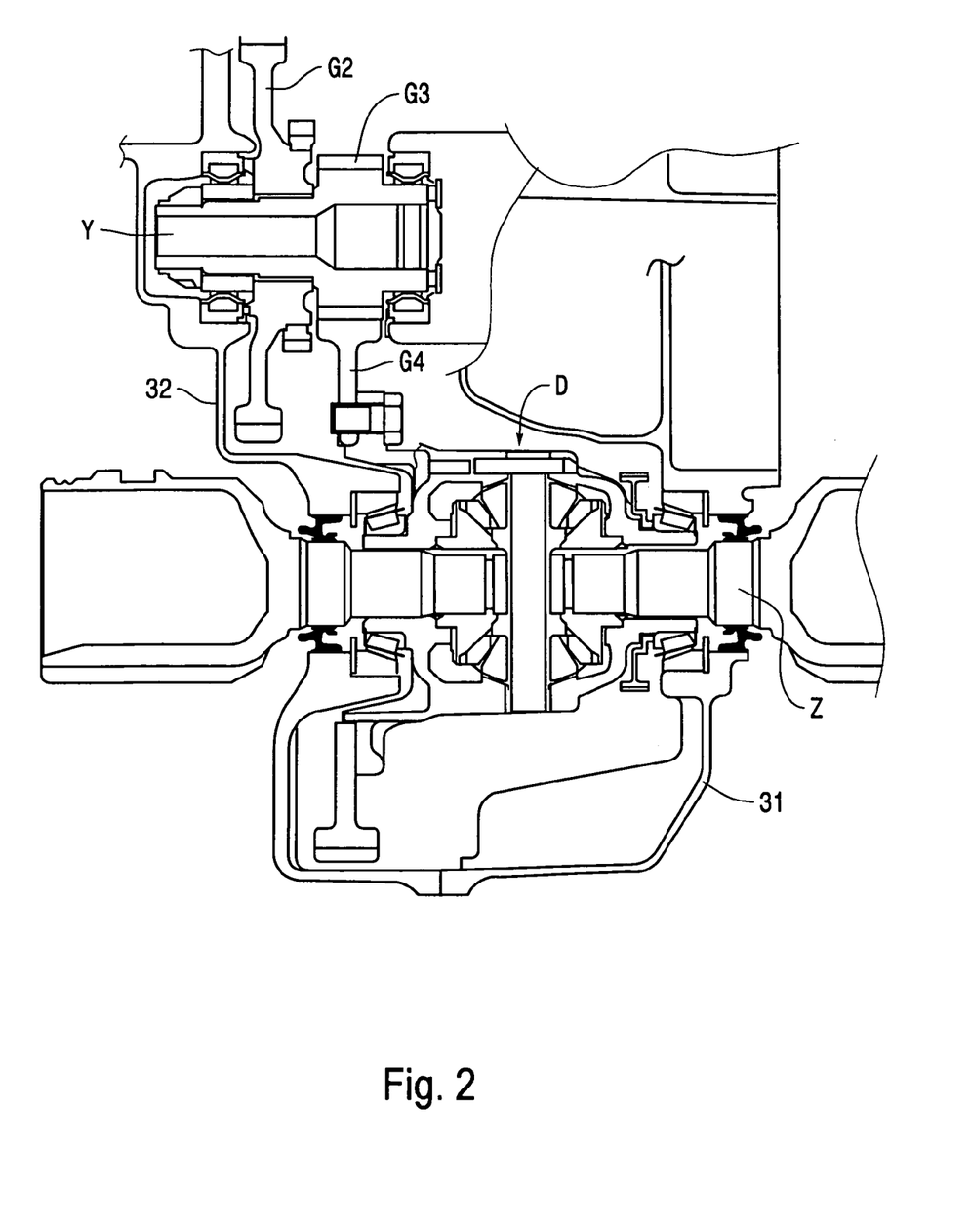
FIG. 2 is a diagram showing the remaining part of the developed sectional view of the drive system.

FIG. 1 shows a part of a developed sectional view of a drive system including electric power devices according to a first embodiment of the invention, taken along an axial direction, and FIG. 2 shows the remaining part of the developed sectional view of the drive system. The drive system is a transaxle-type hybrid drive system which is intended to be used in a vehicle with a transversely mounted engine, and includes two electric power devices, a generator 1 used mainly for power generation and a motor 2 used for driving and energy regeneration, a mode-switching clutch Cm for switching a drive mode, an underdrive unit U for increasing the motor torque, and a differential unit D as main components.

In this drive system, a drive plate Dp having a damper, the generator 1, an oil pump Op, the mode-switching clutch Cm, a counter drive gear G1, and the motor 2 are mounted on a main shaft which is coaxially connected to an engine output shaft E in that order from the end adjacent to the engine. A planetary gear set P1, which serves as a step-up mechanism of the generator 1, is disposed in the inner periphery of the generator 1, and the underdrive unit U is disposed in the inner periphery of the motor 2. The underdrive unit U includes a brake B, a one-way clutch F, a direct clutch Cd, and a planetary gear set P2. The differential unit D is mounted on a differential shaft Z, which is parallel to the main shaft, at approximately. the same position as the generator 1 along the axial direction. The counter drive gear G1, mounted on the main shaft, meshes with a driven gear G2, mounted on a counter shaft Y, and a differential drive pinion gear G3, which is also mounted on the counter shaft Y, meshes with a differential ring gear G4, which is fixed on a case of the differential unit D at approximately the same position as the mode-switching clutch Cm along the axial direction.

Next, the manner in which the above-mentioned components are connected to one another will be described below. The main shaft has an inner shaft which is divided into an input shaft element I and a middle shaft element M, and the mode-switching clutch Cm is connected between the rear end of the input shaft element I and the front end of the middle shaft element M. A rotor 11 of the generator 1 is connected to the input shaft element I at the front end thereof, with the step-up mechanism interposed therebetween. The planetary gear set P1 which serves as the step-up mechanism of the generator 1 has a fixed sun gear, a carrier which functions as an input member, and a ring gear which is rotated with an increased speed, and the rotational speed of the rotor 11, which is connected to the ring gear, is increased compared to the input rotational speed (rotational speed of the engine). A rotor 21 of the motor 2 is connected to the middle shaft element M at the rear end thereof. The planetary gear set P2, included in the underdrive unit U for increasing the torque of the motor 2, has a ring gear which functions as an input member and which is connected to the middle shaft element M at the rear end thereof, a carrier which functions as an output member and which is connected to an output shaft O fitted around the middle shaft element M, and a sun gear which functions as a reaction member. The sun gear can be fixed to a separation wall 32a of a rear case segment 32 with the brake B and the one-way clutch F arranged parallel to each other. The carrier and the sun gear are connected to each other in a disconnectable manner by the direct clutch Cd. In addition, the counter drive gear G1 is integrated with the output shaft O at the front end thereof.

A drive case 3, for containing the above-mentioned components, is made up of three case segments: a front case segment 31, the rear case segment 32, and a rear cover 33. The front case segment 31 has a cylindrical portion and a surrounding wall portion which are formed integrally with each other. The cylindrical portion of the front case segment 31 is placed around the main shaft and is open at both ends thereof with a separation wall 31a provided in the middle. The surrounding wall portion of the front case segment 31 almost entirely covers the differential unit D and supports the counter shaft Y and the differential shaft Z at one end thereof. The rear case segment 32 also has a cylindrical portion and a surrounding wall portion which are formed integrally with each other. The cylindrical portion of the rear case segment 32 is placed around the main shaft and is open at both ends thereof with the separation wall 32a provided in the middle. The separation wall 32a supports the output shaft O and thereby supports the middle shaft element M of the main shaft. The surrounding wall portion of the rear case segment 32 covers a part of the differential unit D and supports the counter shaft Y and the differential shaft Z at the other end thereof. The rear cover 33 covers the cylindrical portion of the rear case segment 32 and supports the middle shaft element M of the main shaft at the rear end thereof.

The drive plate Dp is disposed in front of the separation wall 31a in the cylindrical portion of the front case segment 31. The generator 1, and the step-up mechanism thereof, are disposed behind the separation wall 31a in the cylindrical portion of the front case segment 31. The counter drive gear G1 and the mode-switching clutch Cm are disposed in front of the separation wall 32a in the cylindrical portion of the rear case segment 32, and the oil pump Op is disposed so as to cover the open end of the cylindrical portion. The motor 2 is disposed behind the separation wall 32a in the cylindrical portion of the rear case segment 32, and the underdrive unit U is disposed in the inner periphery of the motor 2. Accordingly, stators 10, 20 of the generator 1 and the motor 2, respectively, are fixed to the corresponding case segments 31, 32, which form the drive case 3, in a non-rotatable manner.

When a vehicle having the drive system structured as described above is driven, the mode-switching clutch Cm is disengaged so that the engine and the generator are separated from the drive system and the vehicle is driven in a series mode. In this mode, the engine torque input to the input shaft element I is mainly used as a driving force of the generator 1, where electrical energy for charging a battery is generated. In this mode, the torque of the motor 2 is increased before it is output to the counter drive gear G1 when the underdrive unit U is activated (when the brake B is engaged and the output rotational speed is reduced by the planetary gear set P2), and is directly output to the counter drive gear G1 when the underdrive unit U is not activated (when the direct clutch Cd is engaged and the planetary gear set P2 is directly connected). Then, the torque of the motor 2 is transferred to the differential unit D via the counter gear mechanism, and is used as a vehicle driving force. When the mode-switching clutch Cm is engaged and the vehicle is driven in a parallel mode, the input shaft. element I and the middle shaft element M are connected to each other and both the engine torque and the motor torque are used as the vehicle driving force. In both modes, the motor 2 performs energy regeneration during coasting.

Next, a structure for integrating inverters 41, 42 with the drive case 3 will be described. In this specification, the term "inverter" refers to a power module constructed by arranging a switching transistor and accessory circuit elements thereof on a circuit board, the switching transistor performing a switching operation of converting direct current from a battery power supply into alternating current (three-phase alternating current if the corresponding electric power device is a three-phase electric power device). In addition, a power module having a smoothing capacitor in the circuit board is also included within the scope of the term. The inverter for the motor included in the vehicle's drive system performs alternating-current to direct-current conversion during the regenerating process, and therefore it must be called a converter to be precise. In the drive system according to the present embodiment, however, substantially identical modules function as an inverter or a converter depending on their usage. Therefore, both the inverter for the motor and the converter for the generator are referred to as an inverter to avoid redundant descriptions.

In the present embodiment, the inverters 41, 42 are collectively attached to the top of the rear case segment 32, which is one of the case segments forming the drive case 3, and a flow path L of a coolant for cooling the inverters 41, 42 is disposed between the rear case segment 32, to which the inverters 41, 42 are attached, and the inverters 41, 42 themselves. More specifically, the inverters 41, 42 are contained in a common inverter case 40 which is attached to the drive case 3, and the flow path L of the coolant is positioned between the rear case segment 32 and the inverter case 40. In this case, the inverter case 40 is attached to the drive case 3 such that it extends over the front case segment 31 and the rear case segment 32, and sealing members 51, 52 are provided between the rear case segment 32 and the inverter case 40 and between the drive case 3 and the inverter case 40, respectively.

When the inverter case 40 is attached to the drive case 3, it is normally fixed to the case segment having a large facing area with respect to the inverter case 40 (the rear case segment 32 in the present embodiment) in view of ensuring attachment strength. However, it is also possible to fix the inverter case 40 to the case segment having a relatively small facing area with respect to the inverter case 40 (the front case segment 31 in the present embodiment) if the situation requires. Alternatively, the inverter case 40 may also be fixed to all of the case segments over which it extends (the front case segment 31 and the rear case segment 32 in the present embodiment) to increase the attachment strength. This can be achieved by processing the attachment surface of the inverter case 40 to form a common surface after the case segments are bonded together.

Figure 3:
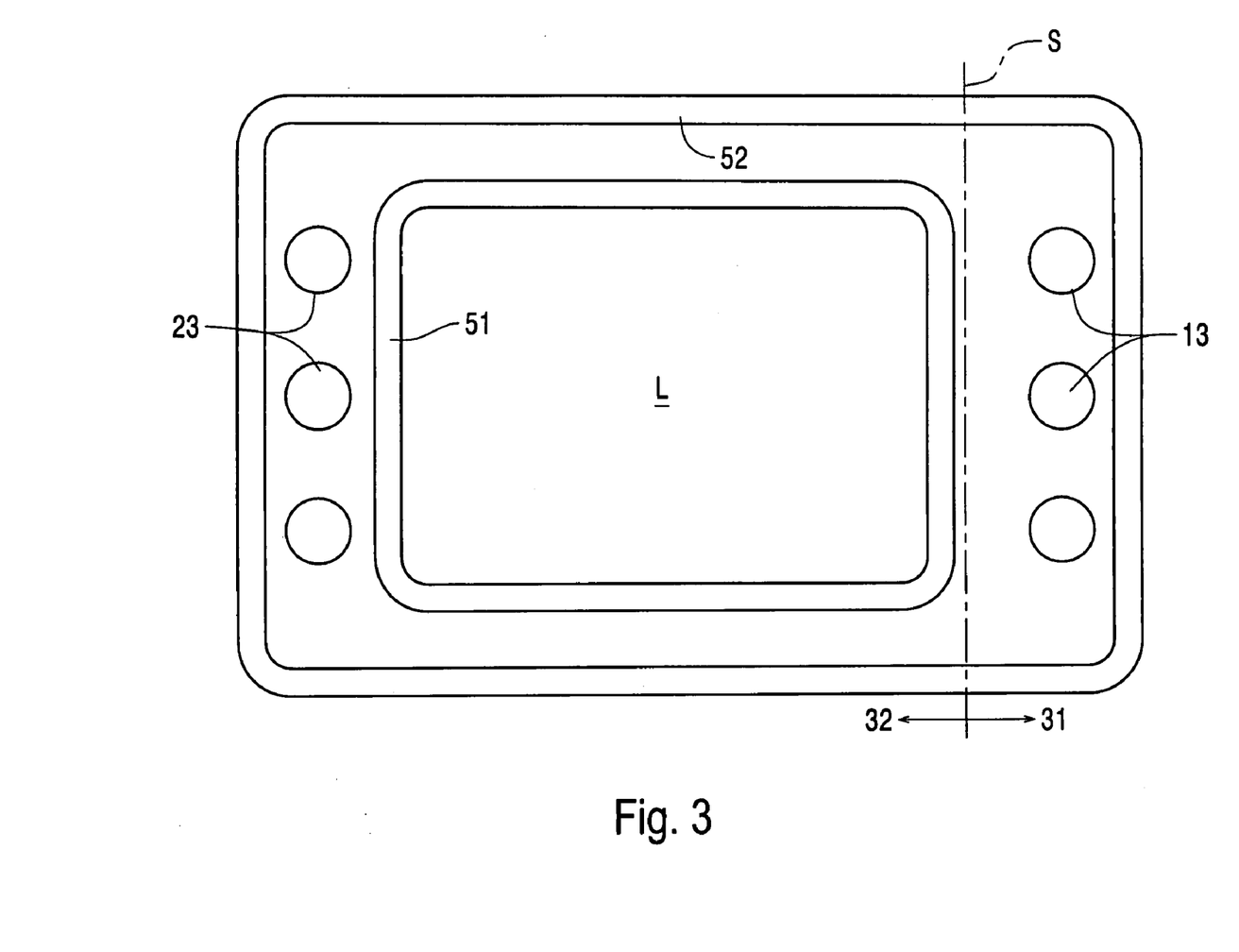
FIG. 3 is a schematic plan view showing the shape of a structure for attaching inverters to the drive system according to the first embodiment.

As shown in FIG. 3, which is a schematic plan view showing the shape of sealing surfaces, the mating surface between the rear case segment 32 and the inverter case 40 has a rectangular frame shape with rounded corners, and the sealing member 51 is provided so as to extend over the rectangular-frame-shaped mating surface. The mating surface between the drive case 3 and the inverter case 40 also has a rectangular frame shape with rounded corners and surrounds the mating surface between the rear case segment 32 and the inverter case 40, and the sealing member 52 is provided so as to extend over the rectangular-frame-shaped mating surface. In this case, the sealing member 51 provided between the rear case segment 32 and the inverter case 40 may be composed of, for example, a liquid gasket, such as a formed-in-place-gasket (FIPG). However, the sealing member 52 provided between the drive case 3 and the inverter case 40 extends across the interface between two case segments (the mating surface between the two case segments is shown by the broken line S in FIG. 3), and is therefore preferably composed of a cork gasket, foam rubber, a grommet, etc., which tolerate a step, i.e., slight misalignment, between the front case segment 31 and the rear case segment 32. Such a step, or misalignment, is inevitable due to processing errors and/or assembly errors. In addition, when a liquid gasket, such as a formed-in-place-gasket (FIPG), is applied between the case segments 31, 32, it is important to apply the liquid gasket such that it protrudes from the mating surface S and comes into contact with the sealing member 52 provided between the drive case 3 and the inverter case 40 at positions where they intersect each other in view of ensuring the sealing effect. Accordingly, a space for accommodating the flow path L, which will be described in detail below, and a space for accommodating terminals 13, 23 for connecting the inverters 41, 42 to their respective electric power devices are provided between the drive case 3 and the inverter case 40. The open top of the inverter case 40 is covered with a cover 46.

In the present embodiment, the flow path L placed between the rear case segment 32 and the inverter case 40 has two layers: a first flow-path layer L1 and a second flow-path layer L2. The first flow-path layer L1 comprises a thin, snake-shaped groove (sectional view of the groove is shown in FIG. 1) which is formed in a heat sink 40a such that it extends over the entire region thereof, the heat sink 40a forming the bottom surface of the inverter case 40 which is raised from the attachment surface of the inverter case 40. The open side of the groove (that is, the bottom surface raised from the attachment surface) is covered with a plate-shaped separator 43 composed of a heat-insulating material or the like. The second flow-path layer L2 comprises a recessed outer surface of the rear case segment 32 and the four walls surrounding the recessed surface opposing the inverter case 40. Various methods may be used for supplying and discharging the coolant to/from the two flow-path layers. For example, the coolant may be supplied into the heat sink 40a from one end of the thin groove which forms the first flow-path layer L1 and drawn out from the other end of the thin groove after the heat exchange with the heat sink 40a where it is injected into the second flow-path layer L2 at one end thereof, and discharged from the other end of the second flow-path layer L2 after the heat exchange with the drive case 3. Alternatively, the coolant may be supplied to the first flow-path layer L1 and the second flow-path layer L2 in parallel and discharged from them in parallel after the heat exchange. In either case, the coolant is preferably supplied and discharged in a circulatory loop using a tube disposed outside the drive system. In this case, a pump and a radiator must be provided in the circulatory loop.

Although the inverters 41, 42 are arranged along the main shaft in the present embodiment, they may also be arranged perpendicularly to the main shaft. In addition, although the inverters 41, 42 are attached to the inverter case 40 by arranging them on the heat sink 40a which forms the bottom surface of the inverter case 40 in the present embodiment, the structure may also be such that the heat sink 40a is formed separately from the inverter case 40 and the inverters 41, 42 are attached to the heat sink 40a.

The inverter 41 is connected to a set of three connection parts for three phases, each connection part having a terminal 13 which extends out from the outer wall of the front case segment 31 and a bus bar 14, and the inverter 42 is connected to a set of three connection parts for three phases, each connection part having a terminal 23 which extends out from the outer wall of the rear case segment 32 and a bus bar 24. More specifically, the terminals 13, 23, extending through the corresponding case segments, are connected to winding leads 12, 22 of the generator 1 and the motor 2, respectively, in the drive case 3, and are connected to the inverters 41, 42 through the bus bars 14, 24, respectively, in a region outside the drive case 3. Thus, the terminals 13, 23 project into the inverter case 40 which extends over the front case segment 31 and the rear case segment 32. This structure is advantageous in that the leads 12, 22 are connected to connecting portions of the terminals 13, 23, respectively, at positions very close to the open sides of the front case segment 31 and the rear case segment 32. For this reason, the connecting process can be easily performed and the bus bars 14, 24 can be easily connected between the inverter 41 and the terminals 13 and between the inverter 42 and the terminals 23, respectively, through the open top of the inverter case 40.

In the present embodiment, each of the terminals 13, 23 comprises coating a conductive member with an insulating material over a region excluding the connecting portions on both ends thereof. Further, an O ring is fitted into a seal groove formed in the insulating material at a position where the terminal extends through the outer wall of the drive case 3 to seal the gap between them. If the bus bars 14, 24 are rigid, no supporting member is provided for supporting the terminals 13, 23 on the drive case 3, as shown in the figure, and the terminals 13, 23 can not move. However, if the bus bars 14, 24 are flexible, the terminals 13, 23 are fixed to the drive case 3 with additional suitable attachments to prevent movement.

As described above, according to the first embodiment, the cooling unit through which the coolant flows for heat insulation and cooling between the drive system and the inverters 41, 42 is positioned only on the outer surface of the rear case segment 32 and does not extend across the connection interface between the case segments 31, 32. Therefore, the risk of leakage of the coolant into the drive case 3 can be substantially eliminated.

Figure 4:
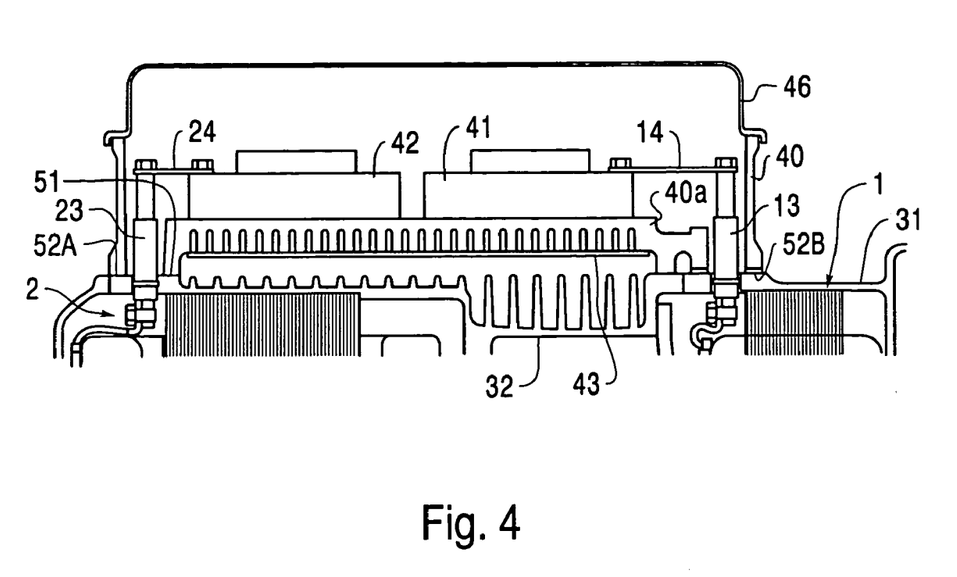
FIG. 4 is a sectional view of a part of a drive system including electric power devices according to a second embodiment of the invention.

FIG. 4 is a sectional view of a part of a drive system according to a second embodiment of the invention. The second embodiment is similar to the drive system of the first embodiment except for the structure of the inverter case. In the first embodiment, no sealing member is provided so as to extend along the connection interface between the front case segment and the rear case segment over which the inverter case extends. In comparison, in the second embodiment, the connection interface between the front case segment 31 and the rear case segment 32 is blocked off from the inner space of the inverter case 40. More specifically, in the second embodiment, the inverter case 40 is attached to the drive case 3 such that it extends over the case segments 31, 32, and sealing members 51, 52A, 52B are provided between the inverter case 40 and the case segments.

Figure 5:
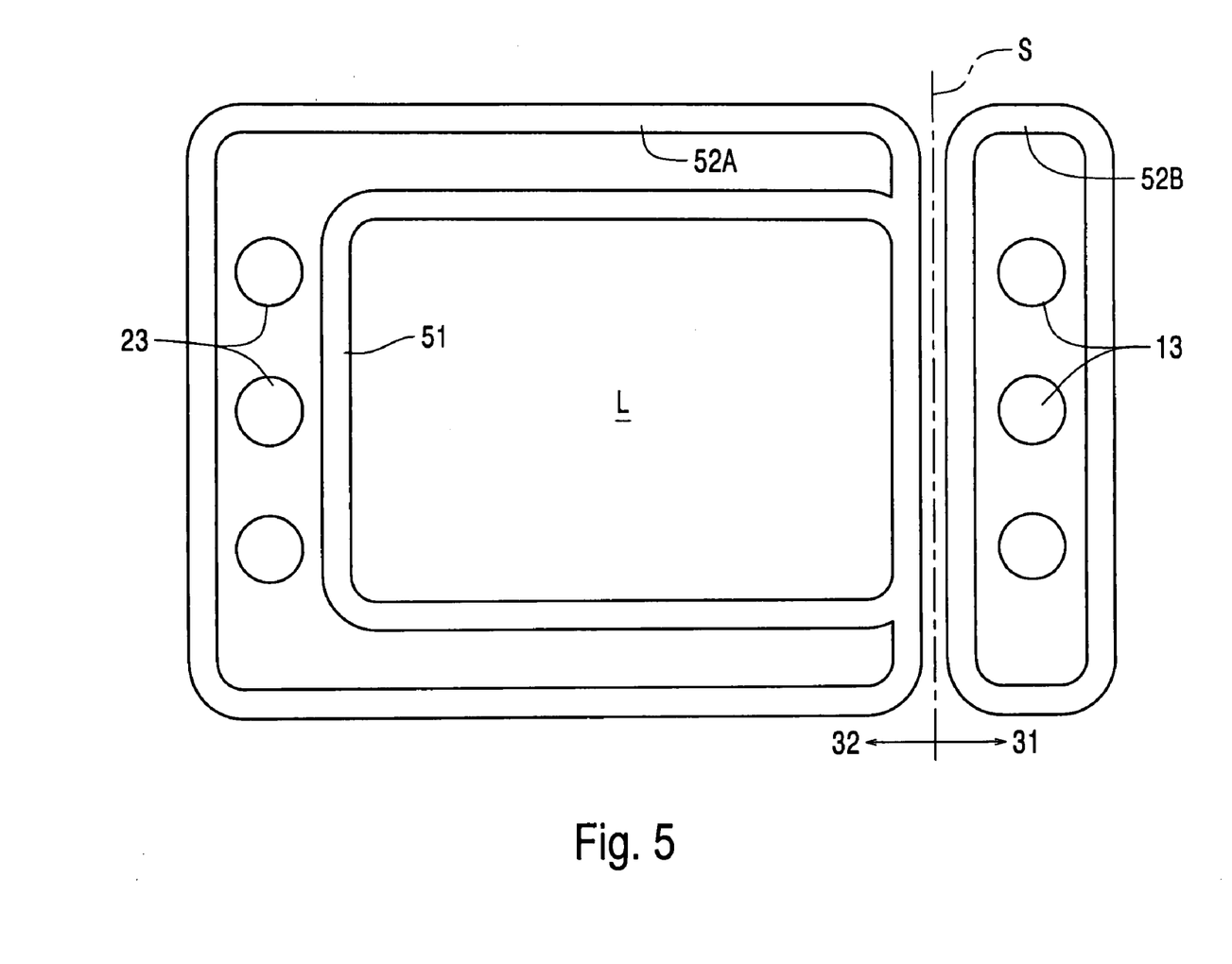
FIG. 5 is a schematic plan view showing the shape of a structure for attaching inverters to the drive system according to the second embodiment.

FIG. 5 is a schematic plan view showing the shape of the mating surface between the drive case 3 and the inverter case 40. In the second embodiment, no sealing member extends across the connection interface S between the front case segment 31 and the rear case segment 32, as is clear from FIG. 5. In this case, the sealing member 52B, composed of a cork gasket, foam rubber, a grommet, etc., which tolerate the above-described step, or misalignment, is provided between the front case segment 31 and the inverter case 40 so as to surround the three-phase terminals 13 for the generator 1. Other structures of the present embodiment are similar to those of the first embodiment. Therefore, components similar to those of the first embodiment are denoted by the same reference numerals and explanations thereof are substantially omitted. The present embodiment is advantageous in that the amount of sealing material applied to the mating surface S between the case segments 31, 32 can be reduced compared to that in the first embodiment.

Figure 6:
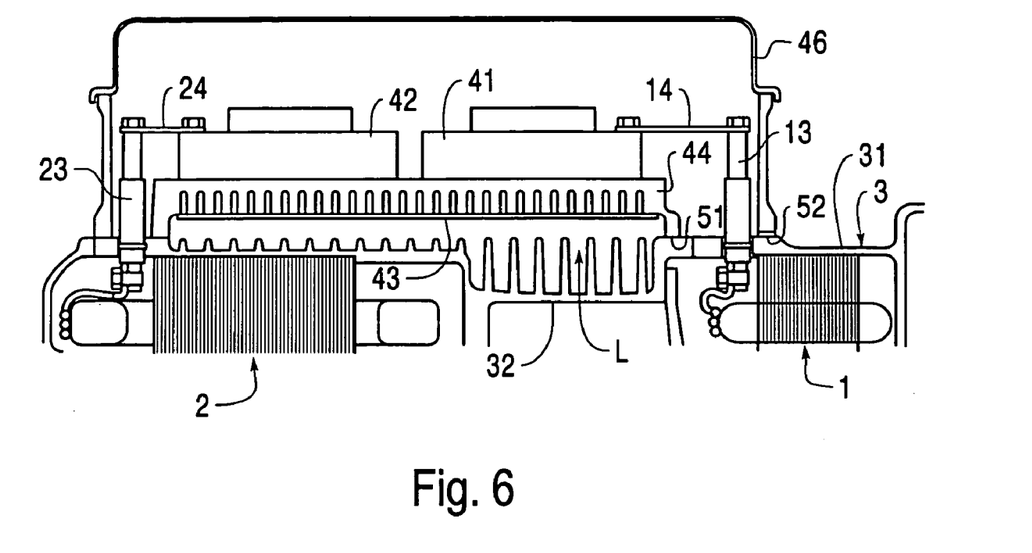
FIG. 6 is a sectional view of a part of a drive system including electric power devices according to a third embodiment of the invention.

FIG. 6 is a sectional view of a part of a drive system according to a third embodiment of the invention. Unlike the first and the second embodiments, the inverter case is omitted in the third embodiment. In the third embodiment, the inverters 41, 42 are fixed to a common base 44, and the base 44 is attached to the rear case segment 32, which is one of the case segments forming the drive case 3. The flow path L of the coolant is positioned between the rear case segment 32 and the base 44. In the present embodiment, the base 44, disposed between the drive case 3 and the inverters 41, 42 is completely supported on the rear case segment 32. Therefore, the mating surface between the base 44 and the rear case segment 32 has no steps, and the sealing member 51 composed of, for example, a FIPG, which has an extremely simple structure, may be used for sealing the flow path of the coolant between them.

The structure of the third embodiment is also suitable for a case in which the inverters 41, 42 are arranged on a common substrate and are included in a single module. In this case, if, for example, the substrate itself is structured as a heat sink, the structure for integrating the inverters 41, 42 with the drive system, similar to that shown in FIG. 6, and the cooling structure can be obtained at the same time.

In the present embodiment, a cover 46 which covers the inverters 41, 42 and their connection parts extends over the front case segment 31 and the rear case segment 32 of the drive case 3. Because a sealing member 52 provided between the cover 46 and the drive case 3 lies on a step, or misalignment, it is composed of a material which tolerates the step, similar to the sealing member provided between the inverter case and the drive case in the above-described embodiments. Other structures of the present embodiment are similar to those of the first embodiment. Therefore, components similar to those of the first embodiment are denoted by the same reference numerals and explanations thereof are thus omitted.

Although first to third embodiments of the invention have been described in detail, the invention is not limited to them, and various modifications are possible within the scope of the claimed invention.

What is claimed is:

1. A drive system, comprising:
a plurality of electric power devices;
a drive case having a plurality of case segments which are connected to each other at mating surfaces thereof, each of the electric power devices being respectively contained in one of the case segments such that one of the electric power devices is contained in one of the case segments and another one of the electric power devices is contained in another one of the case segments; and
a plurality of inverters, one for each of the electric power devices, wherein the inverters are collectively attached to one of the case segments, and a flow path of a coolant for cooling the inverters is positioned between the one of the case segments and the inverters, wherein each one of the electric power devices defines a motor having a stator and each of the stators of the motors are fixed to the corresponding case segments.

2. The drive system according to claim 1, wherein the inverters are contained in a common inverter case which is attached to the drive case and the flow path of the coolant is positioned between the one of the case segments and the inverter case.

3. The drive system according to claim 2, wherein the inverter case is attached to the drive case such that the inverter case extends over the case segments, and two sealing members are provided, one interposed between the one of the case segments and the inverter case and the other between the drive case and the inverter case.

4. The drive system according to claim 3, wherein the sealing member interposed between the drive case and the inverter case tolerates a step between the case segments.

5. The drive system according to claim 4, wherein the electric power devices are connected to the respective inverters with connection parts which extend out from the corresponding case segments.

6. The drive system according to claim 5, wherein each of the connection parts has a terminal which extends through the corresponding case segment and which projects into the inverter case.

7. The drive system according to claim 6, wherein each of the terminals is positioned near an opening of the corresponding case segment.

8. The drive system according to claim 3, wherein the electric power devices are connected to the respective inverters with connection parts which extend out from the corresponding case segments.

9. The drive system according to claim 8, wherein each of the connection parts has a terminal which extends through the corresponding case segment and which projects into the inverter case.

10. The drive system according to claim 9, wherein each of the terminals is positioned near an opening of the corresponding case segment.

11. The drive system according to claim 2, wherein the inverter case is attached to the drive case such that the inverter case extends over the case segments, and a plurality of sealing members are provided, one interposed between each of the case segments and the inverter case.

12. The drive system according to claim 11, wherein the electric power devices are connected to the respective inverters with connection parts which extend out from the corresponding case segments.

13. The drive system according to claim 12, wherein each of the connection parts has a terminal which extends through the corresponding case segment and which projects into the inverter case.

14. The drive system according to claim 13, wherein each of the terminals is positioned near an opening of the corresponding case segment.

15. The drive system according to claim 2, wherein the electric power devices are connected to the respective inverters with connection parts which extend out from the corresponding case segments.

16. The drive system according to claim 15, wherein each of the connection parts has a terminal which extends through the corresponding case segment and which projects into the inverter case.

17. The drive system according to claim 16, wherein each of the terminals is positioned near an opening of the corresponding case segment.

18. The drive system according to claim 1, wherein the inverters are fixed on a common base which is attached to one of the case segments and the flow path of the coolant is positioned between the one of the case segments and the base.

19. The drive system according to claim 18, wherein the electric power devices are connected to the respective inverters with connection parts which extend out from the corresponding case segments.

20. The drive system according to claim 1, wherein the electric power devices are connected to the respective inverters with connection parts which extend out from the corresponding case segments.

21. The drive system according to claim 20, wherein each of the connection parts has a terminal which extends through the corresponding case segment and which projects into the inverter case.

22. The drive system according to claim 21, wherein each of the terminals is positioned near an opening of the corresponding case segment.

23. The drive system according to claim 1, wherein the inverters are arranged perpendicularly to a main shaft of the drive system.

24. The drive system according to claim 1, wherein the inverters are arranged along a main shaft of the drive system.

25. The drive system according to claim 2, wherein the mating surface between one of the case segments and the common inverter case is a substantially rectangular frame with round corners.

* * * * *